(12) United States Patent
Lewis

(10) Patent No.: US 12,111,823 B2
(45) Date of Patent: *Oct. 8, 2024

(54) METHOD AND SYSTEM FOR IMPLEMENTING DATA ASSOCIATIONS

(71) Applicant: CenturyLink Intellectual Property LLC, Broomfield, CO (US)

(72) Inventor: Ronald A. Lewis, Bastrop, LA (US)

(73) Assignee: CenturyLink Intellectual Property LLC, Denver, CO (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/433,607

(22) Filed: Feb. 6, 2024

(65) Prior Publication Data

US 2024/0211468 A1 Jun. 27, 2024

Related U.S. Application Data

(63) Continuation of application No. 18/099,523, filed on Jan. 20, 2023, now Pat. No. 11,899,657, which is a continuation of application No. 17/509,796, filed on Oct. 25, 2021, now Pat. No. 11,561,966, which is a continuation of application No. 16/184,744, filed on Nov. 8, 2018, now Pat. No. 11,163,753.

(60) Provisional application No. 62/731,655, filed on Sep. 14, 2018.

(51) Int. Cl.
G06F 16/23 (2019.01)
G06F 16/2453 (2019.01)

(52) U.S. Cl.
CPC ...... *G06F 16/2379* (2019.01); *G06F 16/2453* (2019.01)

(58) Field of Classification Search
None
See application file for complete search history.

(56) References Cited

U.S. PATENT DOCUMENTS

| 5,504,879 | A | | 4/1996 | Eisenberg | |
|---|---|---|---|---|---|
| 5,592,661 | A | | 1/1997 | Eisenberg | |
| 5,862,325 | A | * | 1/1999 | Reed | H04L 67/62 709/212 |
| 5,890,166 | A | | 3/1999 | Eisenberg | |
| 6,044,205 | A | * | 3/2000 | Reed | H04L 67/51 709/200 |

(Continued)

*Primary Examiner* — Eliyah S. Harper

(57) ABSTRACT

Novel tools and techniques are provided for implementing data storage and/or retrieval, and, more particularly, for implementing data associations. In various embodiments, an associations rules engine might query data aggregation data services to determine whether a first data object (which along with a first relationship rule that indicates a one-to-one relationship between the first data object and a corresponding second data object) is associated with one or more third data objects; might abstract the first data object, the first relationship rule, and the one or more third data objects; might update, in a metadata catalog, a catalog entry corresponding to the first data object with one or more associations among various data objects; and might provide a requesting computing system with access to the catalog entry corresponding to the first data object, the computing system performing one or more computational tasks using the associations stored in the catalog entry.

16 Claims, 7 Drawing Sheets

(56) References Cited

U.S. PATENT DOCUMENTS

| | | | |
|---|---|---|---|
| 6,345,288 B1* | 2/2002 | Reed | H04L 67/55 709/200 |
| 7,016,290 B2 | 3/2006 | Nakano | |
| 7,536,407 B2 | 5/2009 | Lei | |
| 10,606,824 B1* | 3/2020 | Fire | G06F 16/2365 |
| 2003/0154406 A1* | 8/2003 | Honarvar | G07C 9/37 713/153 |
| 2003/0208505 A1 | 11/2003 | Mullins | |
| 2004/0064456 A1* | 4/2004 | Fong | G06F 16/283 |
| 2004/0123048 A1 | 6/2004 | Mullins | |
| 2005/0010580 A1 | 1/2005 | Lancefield | |
| 2005/0228808 A1* | 10/2005 | Mamou | G06F 16/254 |
| 2005/0234969 A1* | 10/2005 | Mamou | G06F 16/254 707/999.102 |
| 2005/0235274 A1* | 10/2005 | Mamou | G06F 16/254 717/136 |
| 2005/0240592 A1* | 10/2005 | Mamou | G06Q 10/10 707/999.009 |
| 2005/0262191 A1* | 11/2005 | Mamou | G06F 16/254 709/203 |
| 2005/0262192 A1* | 11/2005 | Mamou | G06Q 10/10 709/203 |
| 2005/0262193 A1* | 11/2005 | Mamou | G06Q 10/10 709/203 |
| 2006/0010195 A1* | 1/2006 | Mamou | G06Q 10/10 709/203 |
| 2006/0048097 A1* | 3/2006 | Doshi | G06F 8/315 717/106 |
| 2006/0256739 A1 | 11/2006 | Seier | |
| 2007/0011650 A1 | 1/2007 | Hage | |
| 2007/0027880 A1* | 2/2007 | Dettinger | G06F 21/6227 |
| 2008/0120129 A1 | 5/2008 | Seubert | |
| 2010/0241620 A1* | 9/2010 | Manister | G06F 16/313 709/219 |
| 2020/0089793 A1* | 3/2020 | Lewis | G06F 16/215 |
| 2021/0141351 A1* | 5/2021 | Yang | H04L 67/12 |
| 2022/0058185 A1 | 2/2022 | Lewis | |
| 2023/0161757 A1 | 5/2023 | Lewis | |

* cited by examiner

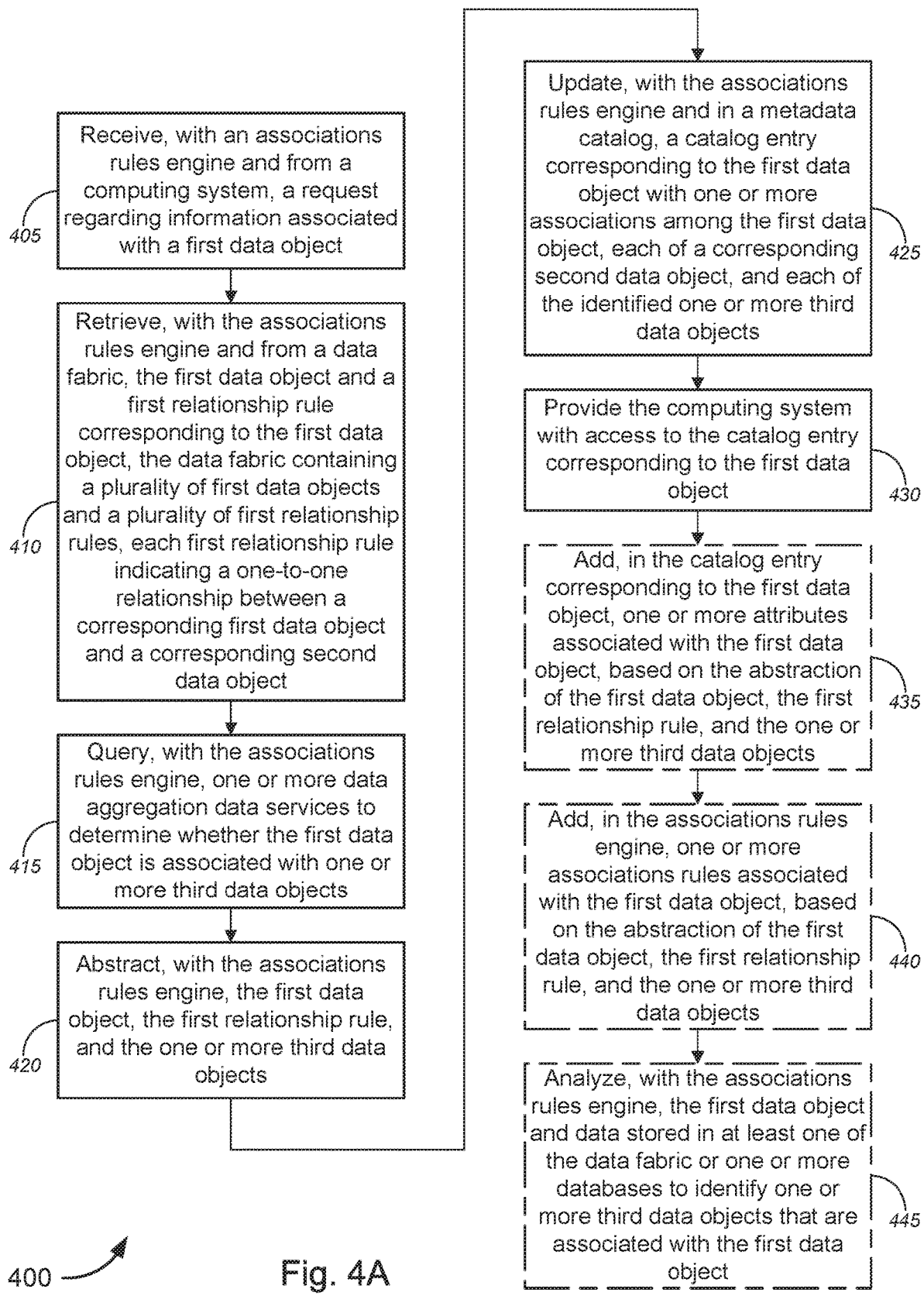

METHOD AND SYSTEM FOR IMPLEMENTING DATA ASSOCIATIONS

COPYRIGHT STATEMENT

A portion of the disclosure of this patent document contains material that is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

FIELD

The present disclosure relates, in general, to methods, systems, and apparatuses for implementing data storage and/or retrieval, and, more particularly, to methods, systems, and apparatuses for implementing data associations.

BACKGROUND

In conventional databases, data or data objects might be organized or stored in terms of one-to-one relationships between pairs of data objects, the rigid structure of which might result in lengthy lists or entries outlining the one-to-one relationships between pairs of data objects. Storage, retrieval, and/or usage of such one-to-one relationships between pairs of data objects might thus be time-consuming and/or costly.

Hence, there is a need for more robust and scalable solutions for implementing data storage and/or retrieval, and, more particularly, to methods, systems, and apparatuses for implementing data associations.

BRIEF DESCRIPTION OF THE DRAWINGS

A further understanding of the nature and advantages of particular embodiments may be realized by reference to the remaining portions of the specification and the drawings, in which like reference numerals are used to refer to similar components. In some instances, a sub-label is associated with a reference numeral to denote one of multiple similar components. When reference is made to a reference numeral without specification to an existing sub-label, it is intended to refer to all such multiple similar components.

FIGS. 4A-4C are flow diagrams illustrating a method for implementing data associations, in accordance with various embodiments.

DETAILED DESCRIPTION OF CERTAIN EMBODIMENTS

Overview

Figure 1:
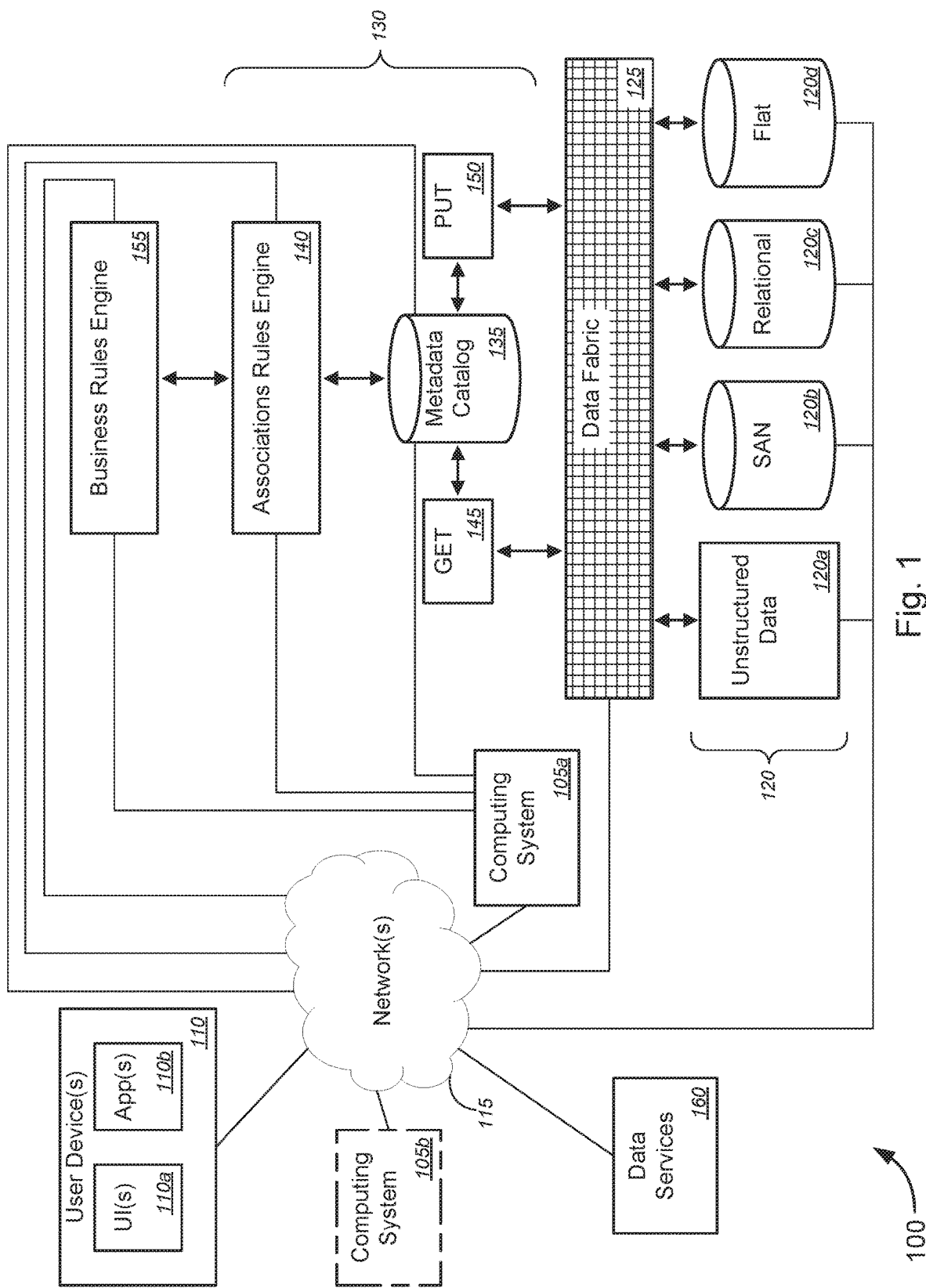
FIG. 1 is a schematic diagram illustrating a system for implementing data associations, in accordance with various embodiments.

Various embodiments provide tools and techniques for implementing data storage and/or retrieval, and, more particularly, to methods, systems, and apparatuses for implementing data associations.

In various embodiments, an associations rules engine might receive, from a computing system, a request regarding information associated with a first data object; might retrieve, from a data fabric, the first data object and a first relationship rule corresponding to the first data object, the data fabric containing a plurality of first data objects and a plurality of first relationship rules, each first relationship rule indicating a one-to-one relationship between a corresponding first data object and a corresponding second data object; might query one or more data aggregation data services to determine whether the first data object is associated with one or more third data objects; might abstract the first data object, the first relationship rule, and the one or more third data objects; might update, in a metadata catalog, a catalog entry corresponding to the first data object with one or more associations among the first data object, each of a corresponding second data object, and each of the identified one or more third data objects; and might provide the computing system with access to the catalog entry corresponding to the first data object, the computing system performing one or more computational tasks using the associations stored in the catalog entry corresponding to the first data object.

These associations amongst the data objects as stored in the catalog entries of the metadata catalog each might, in some embodiments, be represented by rules that may be stored in the association rules engine. The abstraction process might abstract the structure of the one-to-one relationships and might generate the data associations to provide a broader linkage of the data objects. The use of the data associations as generated and as stored in the metadata catalog, as well as the use of the corresponding rules as generated and as stored in the association rules engine, might provide for broader, non-rigid associations (versus rigid one-to-one relationships), while reducing cost of data storage, retrieval, and/or usage, as well as allowing for increasing data virtualization. In some cases, data storage, retrieval, and/or usage of data associations might be performed in a manner that is more efficient compared with data relationships. According to some embodiments, the data associations as described herein may be implemented dynamically.

These and other features and functionalities of the implementation of data associations may be described in greater detail below with respect to FIGS. 1-6.

The following detailed description illustrates a few exemplary embodiments in further detail to enable one of skill in the art to practice such embodiments. The described examples are provided for illustrative purposes and are not intended to limit the scope of the invention.

In the following description, for the purposes of explanation, numerous specific details are set forth in order to provide a thorough understanding of the described embodiments. It will be apparent to one skilled in the art, however, that other embodiments of the present invention may be practiced without some of these specific details. In other instances, certain structures and devices are shown in block diagram form. Several embodiments are described herein, and while various features are ascribed to different embodiments, it should be appreciated that the features described with respect to one embodiment may be incorporated with other embodiments as well. By the same token, however, no single feature or features of any described embodiment should be considered essential to every embodiment of the invention, as other embodiments of the invention may omit such features.

Unless otherwise indicated, all numbers used herein to express quantities, dimensions, and so forth used should be understood as being modified in all instances by the term "about." In this application, the use of the singular includes the plural unless specifically stated otherwise, and use of the terms "and" and "or" means "and/or" unless otherwise indicated. Moreover, the use of the term "including," as well as other forms, such as "includes" and "included," should be considered non-exclusive. Also, terms such as "element" or "component" encompass both elements and components comprising one unit and elements and components that comprise more than one unit, unless specifically stated otherwise.

Various embodiments described herein, while embodying (in some cases) software products, computer-performed methods, and/or computer systems, represent tangible, concrete improvements to existing technological areas, including, without limitation, database technology, data storage technology, data retrieval technology, rules engine technology, and/or the like. In other aspects, certain embodiments, can improve the functioning of user equipment or systems themselves (e.g., databases, rules engines, systems utilizing databases and/or rules engines, etc.), for example, by receiving, with an associations rules engine and from a computing system, a request regarding information associated with a first data object; retrieving, with the associations rules engine and from a data fabric, the first data object and a first relationship rule corresponding to the first data object, the data fabric containing a plurality of first data objects and a plurality of first relationship rules, each first relationship rule indicating a one-to-one relationship between a corresponding first data object and a corresponding second data object; querying, with the associations rules engine, one or more data aggregation data services to determine whether the first data object is associated with one or more third data objects; abstracting, with the associations rules engine, the first data object, the first relationship rule, and the one or more third data objects; updating, with the associations rules engine and in a metadata catalog, a catalog entry corresponding to the first data object with one or more associations among the first data object, each of a corresponding second data object, and each of the identified one or more third data objects; and providing the computing system with access to the catalog entry corresponding to the first data object, the computing system performing one or more computational tasks using the associations stored in the catalog entry corresponding to the first data object; and/or the like.

In particular, to the extent any abstract concepts are present in the various embodiments, those concepts can be implemented as described herein by devices, software, systems, and methods that involve specific novel functionality (e.g., steps or operations). For instance, the abstraction process might abstract the structure of the one-to-one relationships and might generate the data associations to provide a broader linkage of the data objects. The use of the data associations as generated and as stored in the metadata catalog, as well as the use of the corresponding rules as generated and as stored in the association rules engine, might provide for broader, non-rigid associations (versus rigid one-to-one relationships), while reducing cost of data storage, retrieval, and/or usage, as well as allowing for increasing data virtualization. In some cases, data storage, retrieval, and/or usage of data associations might be performed in a manner that is more efficient compared with data relationships. According to some embodiments, the data associations as described herein may be implemented dynamically. These extend beyond mere conventional computer processing operations. These functionalities can produce tangible results outside of the implementing computer system, including, merely by way of example, optimized, robust, cost-effective, and/or more efficient data retrieval, storage, and/or usage that may result in optimized, robust, cost-effective, and/or more efficient computation of tasks by computing systems, and/or the like, at least some of which may be observed or measured by users and/or service providers.

In an aspect, a method might comprise receiving, with an associations rules engine and from a computing system, a request regarding information associated with a first data object; retrieving, with the associations rules engine and from a data fabric, the first data object and a first relationship rule corresponding to the first data object, the data fabric containing a plurality of first data objects and a plurality of first relationship rules, each first relationship rule indicating a one-to-one relationship between a corresponding first data object and a corresponding second data object; and querying, with the associations rules engine, one or more data aggregation data services to determine whether the first data object is associated with one or more third data objects. The method might further comprise abstracting, with the associations rules engine, the first data object, the first relationship rule, and the one or more third data objects; updating, with the associations rules engine and in a metadata catalog, a catalog entry corresponding to the first data object with one or more associations among the first data object, each of a corresponding second data object, and each of the identified one or more third data objects; and providing the computing system with access to the catalog entry corresponding to the first data object, the computing system performing one or more computational tasks using the associations stored in the catalog entry corresponding to the first data object.

In some embodiments, the method might further comprise adding, in the catalog entry corresponding to the first data object, one or more attributes associated with the first data object, based on the abstraction of the first data object, the first relationship rule, and the one or more third data objects. In some cases, adding, in the catalog entry corresponding to the first data object, the one or more attributes associated with the first data object might comprise adding, with the association rules engine and in the catalog entry corresponding to the first data object, one or more attributes associated with the first data object, based on the abstraction of the first data object, the first relationship rule, and the one or more third data objects. Alternatively, adding, in the catalog entry corresponding to the first data object, the one or more attributes associated with the first data object might comprise adding, by a developer and in the catalog entry corresponding to the first data object, one or more attributes associated with the first data object, based on the abstraction of the first data object, the first relationship rule, and the one or more third data objects.

According to some embodiments, the method might further comprise adding, in the associations rules engine, one or more associations rules associated with the first data object, based on the abstraction of the first data object, the first relationship rule, and the one or more third data objects. In some instances, adding, in the associations rules engine, the one or more associations rules associated with the first data object might comprise adding, by the associations rules engine and in the associations rules engine, one or more associations rules associated with the first data object, based on the abstraction of the first data object, the first relationship rule, and the one or more third data objects. Alternatively, adding, in the associations rules engine, the one or more associations rules associated with the first data object might comprise adding, by a developer and in the associations rules engine, one or more associations rules associated with the first data object, based on the abstraction of the first data object, the first relationship rule, and the one or more third data objects.

In some embodiments, the method might further comprise analyzing, with the associations rules engine, the first data object and data stored in at least one of the data fabric or one or more databases to identify one or more third data objects that are associated with the first data object. According to some embodiments, association between the first data object and each of the one or more third data objects might be defined by a business rules engine, which is separate from the associations rules engine, where the one or more data aggregation data services might store the association between the first data object and each of the one or more third data objects as defined by the business rules engine.

In another aspect, an associations rules engine might comprise at least one processor and a non-transitory computer readable medium communicatively coupled to the at least one processor. The non-transitory computer readable medium might have stored thereon computer software comprising a set of instructions that, when executed by the at least one processor, causes the associations rules engine to: receive, from a computing system, a request regarding information associated with a first data object; retrieve, from a data fabric, the first data object and a first relationship rule corresponding to the first data object, the data fabric containing a plurality of first data objects and a plurality of first relationship rules, each first relationship rule indicating a one-to-one relationship between a corresponding first data object and a corresponding second data object; query one or more data aggregation data services to determine whether the first data object is associated with one or more third data objects; abstract the first data object, the first relationship rule, and the one or more third data objects; update, in a metadata catalog, a catalog entry corresponding to the first data object with one or more associations among the first data object, each of a corresponding second data object, and each of the identified one or more third data objects; and provide the computing system with access to the catalog entry corresponding to the first data object, the computing system performing one or more computational tasks using the associations stored in the catalog entry corresponding to the first data object.

In some embodiments, the set of instructions, when executed by the at least one processor, might further cause the associations rules engine to: add, in the catalog entry corresponding to the first data object, one or more attributes associated with the first data object, based on the abstraction of the first data object, the first relationship rule, and the one or more third data objects. Alternatively, the set of instructions, when executed by the at least one processor, might further cause the associations rules engine to: add, in the associations rules engine, one or more associations rules associated with the first data object, based on the abstraction of the first data object, the first relationship rule, and the one or more third data objects.

According to some embodiments, the set of instructions, when executed by the at least one processor, might further cause the associations rules engine to: analyze the first data object and data stored in at least one of the data fabric or one or more databases to identify one or more third data objects that are associated with the first data object. In some embodiments, association between the first data object and each of the one or more third data objects might be defined by a business rules engine, which is separate from the associations rules engine, where the one or more data aggregation data services might store the association between the first data object and each of the one or more third data objects as defined by the business rules engine.

In yet another aspect, a system might comprise a computing system and an association rules engine. The computing system might comprise at least one first processor and a first non-transitory computer readable medium communicatively coupled to the at least one first processor. The first non-transitory computer readable medium might have stored thereon computer software comprising a first set of instructions that, when executed by the at least one first processor, causes the computing system to: send, to an association rules engine, a request regarding information associated with a first data object.

The association rules engine might comprise at least one second processor and a second non-transitory computer readable medium communicatively coupled to the at least one second processor. The second non-transitory computer readable medium might have stored thereon computer software comprising a second set of instructions that, when executed by the at least one second processor, causes the association rules engine to: receive, from the computing system, the request regarding information associated with the first data object; retrieve, from a data fabric, the first data object and a first relationship rule corresponding to the first data object, the data fabric containing a plurality of first data objects and a plurality of first relationship rules, each first relationship rule indicating a one-to-one relationship between a corresponding first data object and a corresponding second data object; query one or more data aggregation data services to determine whether the first data object is associated with one or more third data objects; abstract the first data object, the first relationship rule, and the one or more third data objects; update, in a metadata catalog, a catalog entry corresponding to the first data object with one or more associations among the first data object, each of a corresponding second data object, and each of the identified one or more third data objects; and provide the computing system with access to the catalog entry corresponding to the first data object. The first set of instructions, when executed by the at least one first processor, might cause the computing system to: access the catalog entry corresponding to the first data object; and perform one or more computational tasks using the associations stored in the catalog entry corresponding to the first data object.

In some embodiments, the second set of instructions, when executed by the at least one second processor, might further cause the associations rules engine to: add, in the catalog entry corresponding to the first data object, one or more attributes associated with the first data object, based on the abstraction of the first data object, the first relationship rule, and the one or more third data objects. Alternatively, the second set of instructions, when executed by the at least one second processor, might further cause the associations rules engine to: add, in the associations rules engine, one or more associations rules associated with the first data object, based on the abstraction of the first data object, the first relationship rule, and the one or more third data objects.

According to some embodiments, the second set of instructions, when executed by the at least one second processor, might further cause the associations rules engine to: analyze the first data object and data stored in at least one of the data fabric or one or more databases to identify one or more third data objects that are associated with the first data object. In some embodiments, association between the first data object and each of the one or more third data objects might be defined by a business rules engine, which is separate from the associations rules engine, where the one or more data aggregation data services might store the association between the first data object and each of the one or more third data objects as defined by the business rules engine.

Various modifications and additions can be made to the embodiments discussed without departing from the scope of the invention. For example, while the embodiments described above refer to particular features, the scope of this invention also includes embodiments having different combination of features and embodiments that do not include all of the above described features.

Specific Exemplary Embodiments

We now turn to the embodiments as illustrated by the drawings. FIGS. 1-6 illustrate some of the features of the method, system, and apparatus for implementing data storage and/or retrieval, and, more particularly, to methods, systems, and apparatuses for implementing data associations, as referred to above. The methods, systems, and apparatuses illustrated by FIGS. 1-6 refer to examples of different embodiments that include various components and steps, which can be considered alternatives or which can be used in conjunction with one another in the various embodiments. The description of the illustrated methods, systems, and apparatuses shown in FIGS. 1-6 is provided for purposes of illustration and should not be considered to limit the scope of the different embodiments.

With reference to the figures, FIG. 1 is a schematic diagram illustrating a system 100 for implementing data associations, in accordance with various embodiments.

In the non-limiting embodiment of FIG. 1, system 100 might comprise computing system 105a. System 100, according to some embodiments, might further comprise one or more user devices 110, each comprising user interface(s) ("UI(s)") 110a and software application(s) ("App(s)") 110b. In some cases, system 100 might further comprise one or more networks 115 communicatively coupling computing system 105a and user devices 110. In some embodiments, system 100 might further comprise one or more relational databases 120 and data fabric 125. The one or more relational databases 120 might include, but are not limited to, unstructured data lists 120a, storage-area networks ("SANs") 120b, relational databases 120c, and flat file databases 120d, and/or the like.

System 100 might further comprise abstraction layer 130, including, without limitation, metadata catalog 135, associations rules engine 140, get function 145, and put function 150, and/or the like. System 100 might further comprise business rules engine 155 and data services 160. In some embodiments, system 100 might further comprise remote computing system 105b (optional) that communicatively couple, via the one or more networks 115, with at least one of the one or more user devices 110, the relational databases 120a-120d, the data fabric 125, the metadata catalog 135, the associations rules engine 140, the business rules engine 155, the data services 160, and/or the like.

In operation, associations rules engine 140 might receive a request regarding information associated with a first data object. In some embodiments, the request might be sent, via network(s) 115, from a user via at least one of the one or more UIs 110a and/or the one or more Apps 110b of at least one of the one or more user devices 110. Alternatively, or additionally, the request might be sent either directly from computing system 105a or indirectly from computing system 105b via network(s) 115.

The associations rules engine 140 might retrieve, from data fabric 125 via get function 145, the first data object and a first relationship rule corresponding to the first data object, the data fabric containing a plurality of first data objects and a plurality of first relationship rules as obtained by relational database 120, each first relationship rule indicating a one-to-one relationship between a corresponding first data object and a corresponding second data object. According to some embodiments, the associations rules engine 140 might query one or more data aggregation data services 160 or the like to determine whether the first data object is associated with one or more third data objects. The associations rules engine 140 might abstract the first data object, the first relationship rule, and the one or more third data objects. The associations rules engine 140 might update, in metadata catalog 135 via put function 150, a catalog entry corresponding to the first data object with one or more associations among the first data object, each of a corresponding second data object, and each of the identified one or more third data objects. The associations rules engine 140 might provide the user device(s) 110, the computing system 105a, or the computing system 105b with access to the catalog entry corresponding to the first data object. The user device(s) 110, the computing system 105a, or the computing system 105b might perform one or more computational tasks using the associations stored in the catalog entry corresponding to the first data object.

These associations amongst the data objects as stored in the catalog entries of the metadata catalog 135 each might, in some embodiments, be represented by rules that may be stored in the association rules engine 140. The abstraction process might abstract the structure of the one-to-one relationships and might generate the data associations to provide a broader linkage of the data objects. The use of the data associations as generated and as stored in the metadata catalog 135, as well as the use of the corresponding rules as generated and as stored in the association rules engine 140, might provide for broader, non-rigid associations (versus rigid one-to-one relationships), while reducing cost of data storage, retrieval, and/or usage, as well as allowing for increasing data virtualization. In some cases, data storage, retrieval, and/or usage of data associations might be performed in a manner that is more efficient compared with data relationships. According to some embodiments, the data associations as described herein may be implemented dynamically.

In some embodiments, the associations rules engine 140 might add, in the catalog entry of the metadata catalog 135 corresponding to the first data object, one or more attributes associated with the first data object, based on the abstraction of the first data object, the first relationship rule, and the one or more third data objects. Alternatively, a developer (not shown) might utilize a computing system (either computing system 105a, computing system 105b, or other system) to add, in the catalog entry of the metadata catalog 135 corresponding to the first data object, one or more attributes associated with the first data object, based on the abstraction of the first data object, the first relationship rule, and the one or more third data objects.

Alternatively, or additionally, the associations rules engine 140 might add, in the associations rules engine, one or more associations rules associated with the first data object, based on the abstraction of the first data object, the first relationship rule, and the one or more third data objects. Alternatively, a developer (not shown) might utilize a computing system (either computing system 105*a*, computing system 105*b*, or other system) to add, in the associations rules engine, one or more associations rules associated with the first data object, based on the abstraction of the first data object, the first relationship rule, and the one or more third data objects.

According to some embodiments, the associations rules engine 140, the computing system 105*a*, the computing system 105*b*, or at least one user device 110 might analyze the first data object and data stored in at least one of the data fabric or one or more databases to identify one or more third data objects that are associated with the first data object. In some embodiments, association between the first data object and each of the one or more third data objects might be defined by business rules engine 155, which is separate from the associations rules engine 140, where the one or more data aggregation data services 160 or the like might store the association between the first data object and each of the one or more third data objects as defined by the business rules engine 155.

Figure 2:
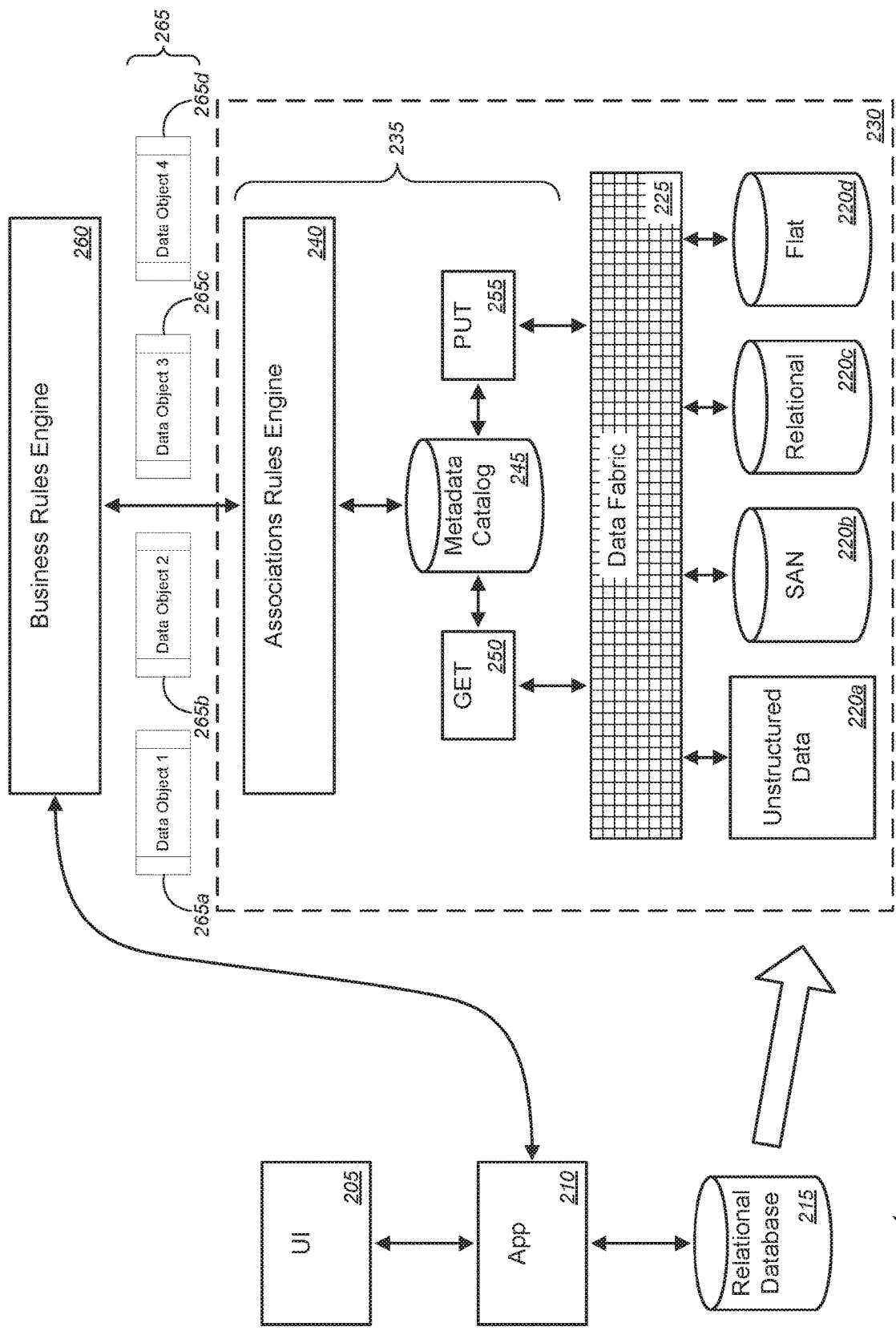
FIG. 2 is a schematic diagram illustrating another system for implementing data associations, in accordance with various embodiments.

FIG. 2 is a schematic diagram illustrating another system 200 for implementing data associations, in accordance with various embodiments.

In some embodiments, system 200 might comprise user interface ("UI") 205, a software application ("App") 210, and relational database 215. In some instances, system 200 might further comprise unstructured data lists 220*a*, storage-area networks ("SANs") 220*b*, relational databases 220*c*, and flat file databases 220*d*, and/or the like. In some cases, system 200 might also comprise data fabric 225. The unstructured data lists 220*a*, the SANs 220*b*, the relational databases 220*c*, the flat file databases 220*d*, and the data fabric 225 might be part of a data services system 230.

In the non-limiting embodiment 200 of FIG. 2, the data services system 230 might further comprise an abstraction layer 235, which might include, without limitation, associations rules engine 240, metadata catalog 245, get function 250, and put function 255, and/or the like. System 200 might further comprise business rules engine 260 and one or more data objects 265*a*-265*d* (collectively, "data objects 265" or the like).

In operation, associations rules engine 240 might receive a request regarding information associated with a first data object 265*a*. In some embodiments, the request might be sent from a user via at least one of the UI 205 and/or the App 210.

The associations rules engine 240 might retrieve, from data fabric 225 via get function 250, the first data object 265*a* and a first relationship rule corresponding to the first data object 265*a*, the data fabric containing a plurality of first data objects 265*a* and a plurality of first relationship rules, each first relationship rule indicating a one-to-one relationship between a corresponding first data object 265*a* and a corresponding second data object 265*b*. According to some embodiments, the associations rules engine 240 might query one or more data aggregation data services or the like to determine whether the first data object 265*a* is associated with one or more third data objects 265*c*. The associations rules engine 240 might abstract the first data object 265*a*, the first relationship rule, and the one or more third data objects 265*c*. The associations rules engine 240 might update, in metadata catalog 245 via put function 255, a catalog entry corresponding to the first data object 265*a* with one or more associations among the first data object 265*a*, each of a corresponding second data object 265*b*, and each of the identified one or more third data objects 265*c*. The associations rules engine 240 might provide the UI 205 and/or the App 210 with access to the catalog entry corresponding to the first data object 265*a*. The App 210 might perform one or more computational tasks using the associations stored in the catalog entry corresponding to the first data object 265*a*.

These associations amongst the data objects as stored in the catalog entries of the metadata catalog 245 each might, in some embodiments, be represented by rules that may be stored in the association rules engine 240. The abstraction process might abstract the structure of the one-to-one relationships and might generate the data associations to provide a broader linkage of the data objects. The use of the data associations as generated and as stored in the metadata catalog 245, as well as the use of the corresponding rules as generated and as stored in the association rules engine 240, might provide for broader, non-rigid associations (versus rigid one-to-one relationships), while reducing cost of data storage, retrieval, and/or usage, as well as allowing for increasing data virtualization. In some cases, data storage, retrieval, and/or usage of data associations might be performed in a manner that is more efficient compared with data relationships. According to some embodiments, the data associations as described herein may be implemented dynamically.

In some embodiments, the associations rules engine 240 might add, in the catalog entry of the metadata catalog 245 corresponding to the first data object 265*a*, one or more attributes associated with the first data object 265*a*, based on the abstraction of the first data object 265*a*, the first relationship rule, and the one or more third data objects 265*c*. Alternatively, a developer (not shown) might utilize the UI 205 and/or the App 210, or the like, to add, in the catalog entry of the metadata catalog 245 corresponding to the first data object 265*a*, one or more attributes associated with the first data object 265*a*, based on the abstraction of the first data object 265*a*, the first relationship rule, and the one or more third data objects 265*c*.

Alternatively, or additionally, the associations rules engine 240 might add, in the associations rules engine, one or more associations rules associated with the first data object 265*a*, based on the abstraction of the first data object 265*a*, the first relationship rule, and the one or more third data objects 265*c*. Alternatively, a developer (not shown) might utilize the UI 205 and/or the App 210, or the like, to add, in the associations rules engine, one or more associations rules associated with the first data object 265*a*, based on the abstraction of the first data object 265*a*, the first relationship rule, and the one or more third data objects 265*c*.

According to some embodiments, the associations rules engine 240 might analyze the first data object 265*a* and data stored in at least one of the data fabric or one or more databases to identify one or more third data objects 265*c* that are associated with the first data object 265*a*. In some embodiments, association between the first data object 265*a* and each of the one or more third data objects 265*c* might be defined by business rules engine 260, which is separate from the associations rules engine 240, where the one or more data aggregation data services or the like might store the association between the first data object 265a and each of the one or more third data objects 265c as defined by the business rules engine 260.

Figure 3:
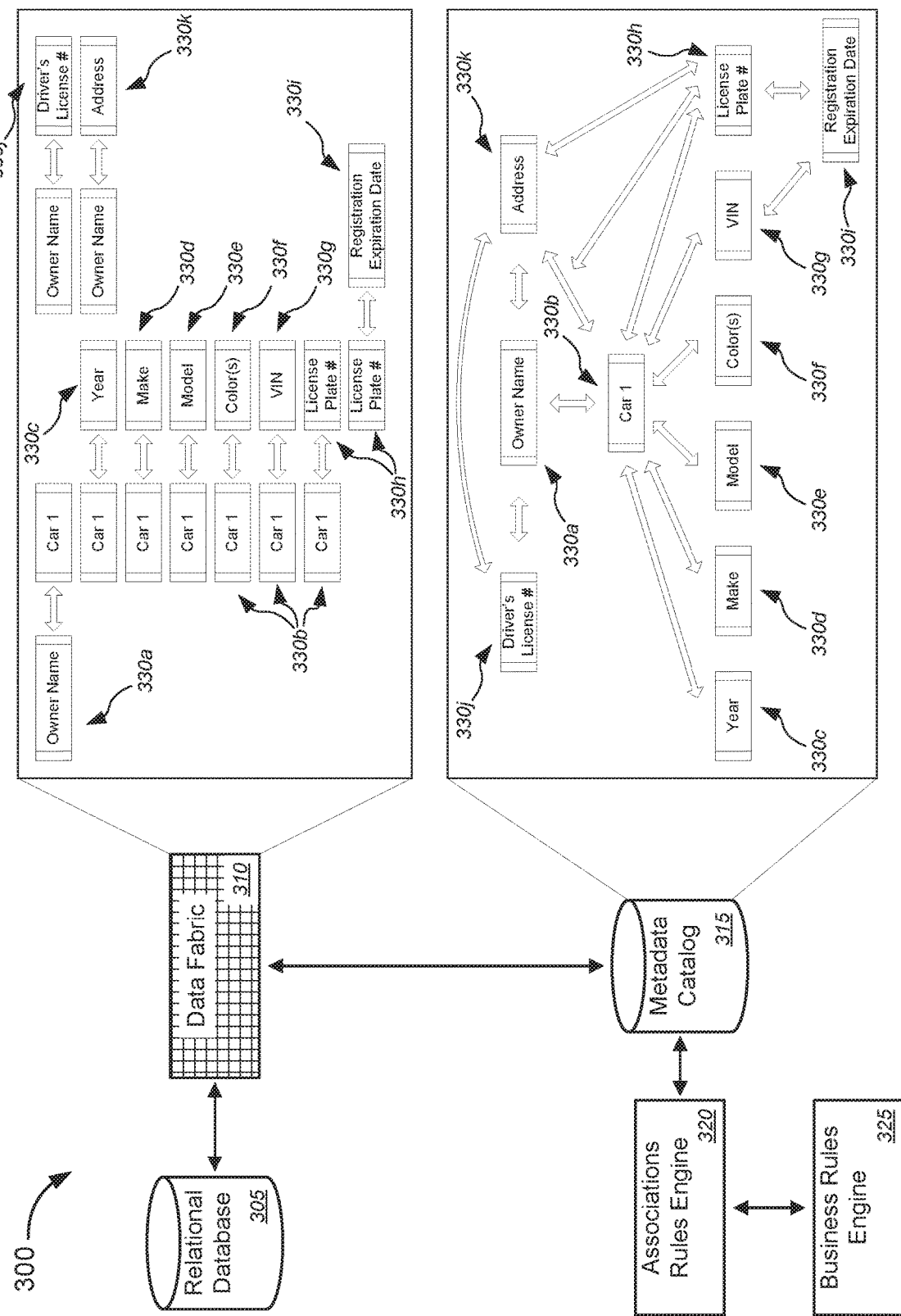
FIG. 3 is a schematic diagram illustrating a non-limiting example of converting one-to-one data relationships between pairs of data objects to data associations among a plurality of data objects as part of the implementation of data associations, in accordance with various embodiments.

FIG. 3 is a schematic diagram illustrating a non-limiting example 300 of converting one-to-one data relationships between pairs of data objects to data associations among a plurality of data objects as part of the implementation of data associations, in accordance with various embodiments.

In some embodiments, a system might comprise relational database 305, data fabric 310, metadata catalog 315, associations rules engine 320, business rules engine 325, and a plurality of data objects 330. Data fabric 310 might collect data or data objects in relational database 305. As shown in FIG. 3, the data in the data fabric 310 might be organized in terms of one-on-one relationships between pairs of data objects 330. In other words, the data objects 330 stored within the data fabric 310 might be related to each other in pairs or in one-to-one relationships.

In the non-limiting example 300, an example of car ownership is used to illustrate one-to-one data relationships (as depicted by double arrow lines between data objects 330) between pairs of data objects versus data associations among a plurality of data objects as part of the implementation of data associations. In this example, data objects 330 might comprise data or information packets including, without limitation, owner name 330a, car 1 330b, year 330c, make 330d, model 330e, color(s) 330f, vehicle identification number ("VIN") 330g, license plate number 330h, registration expiration date 330i, driver's license number 330j, address 330k, and/or the like. Here, for instance, owner name 330a might be in a one-to-one relationship with car 1 330b. Car 1 330b might be in a one-to-one relationship with year 330c. Car 1 330b might be in a one-to-one relationship with make 330d. Car 1 330b might be in a one-to-one relationship with model 330e. Car 1 330b might be in a one-to-one relationship with color(s) 330f. Car 1 330b might be in a one-to-one relationship with VIN 330g. Car 1 330b might be in a one-to-one relationship with license plate number 330h. License plate number 330h might be in a one-to-one relationship with registration expiration date 330i. Owner name 330a might be in a one-to-one relationship with driver's license number 330j. Owner name 330a might be in a one-to-one relationship with address 330k.

In contrast, after abstraction of the data stored in the data fabric by the associations rules engine 320 (and informed by business rules engine 325) and subsequently stored in the metadata catalog 315 (the process or technique of which may be as described above with respect to the embodiments of FIGS. 1 and/or 2), data associations among a plurality of data objects. For instance, owner name 330a might be associated with each of car 1 330b, license plate number 330h, driver's license number 330j, and address 330k, and might be stored in a catalog entry of the metadata catalog 315. Driver's license number 330j might be associated with each of owner name 330a and address 330k, and might be stored in a catalog entry of the metadata catalog 315. Correspondingly, address 330k might be associated with each of owner name 330a, license plate number 330h, and driver's license number 330j, and might be stored in a catalog entry of the metadata catalog 315. Likewise, car 1 330b might be associated with each of owner name 330a, year 330c, make 330d, model 330e, color(s) 330f, VIN 330g, and license plate number 330h, and might be stored in a catalog entry of the metadata catalog 315. VIN 330g might be associated with each of car 1 330b and registration expiration date 330i, and might be stored in a catalog entry of the metadata catalog 315. License plate number 330h might be associated with each of owner name 330a, car 1 330b, registration expiration date 330i, and address 330k, and might be stored in a catalog entry of the metadata catalog 315. Correspondingly, registration expiration date 330i might be associated with each of VIN 330g and license plate number 330h, and might be stored in a catalog entry of the metadata catalog 315.

These associations amongst the data objects as stored in the catalog entries of the metadata catalog 315 each might, in some embodiments, be represented by rules that may be stored in the association rules engine 320. The abstraction process might abstract the structure of the one-to-one relationships and might generate the data associations to provide a broader linkage of the data objects 330. The use of the data associations as generated and as stored in the metadata catalog 315, as well as the use of the corresponding rules as generated and as stored in the association rules engine 320, might provide for broader, non-rigid associations (versus rigid one-to-one relationships), while reducing cost of data storage, retrieval, and/or usage, as well as allowing for increasing data virtualization. In some cases, data storage, retrieval, and/or usage of data associations might be performed in a manner that is more efficient compared with data relationships. According to some embodiments, the data associations as described herein may be implemented dynamically.

Figure 4B:
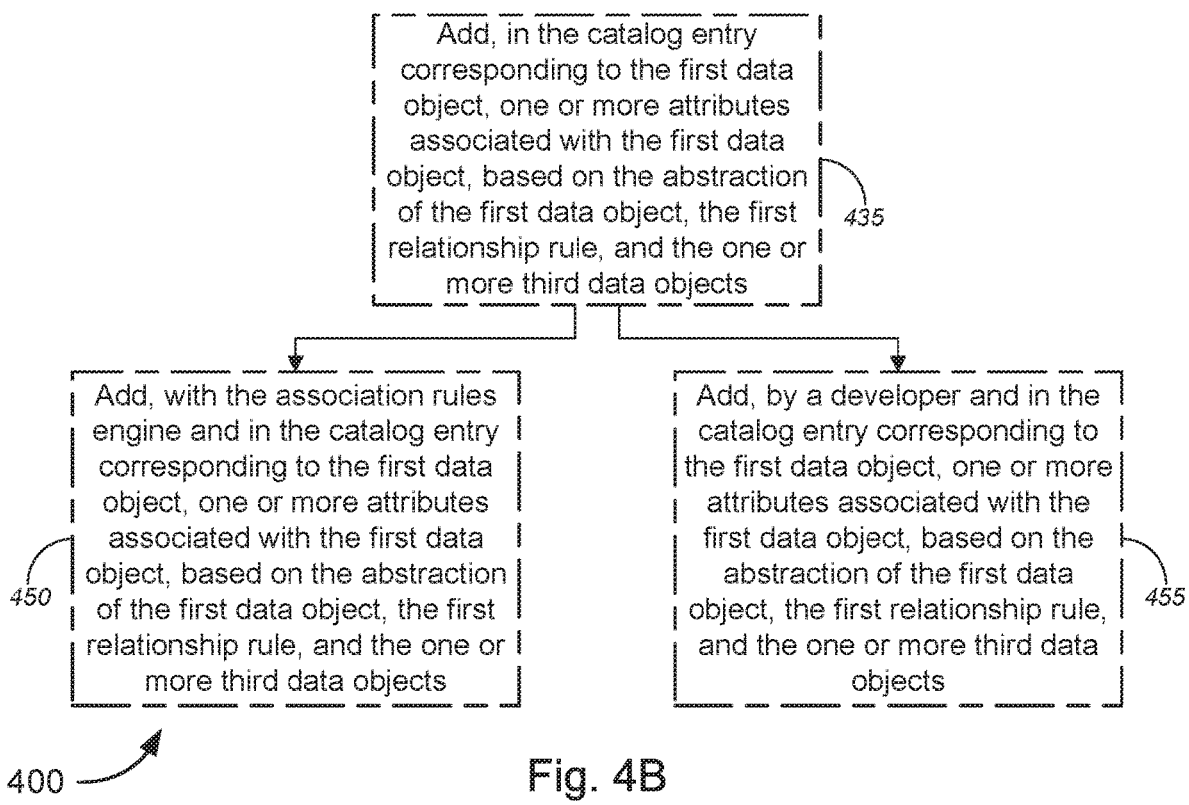
Figure 4C:
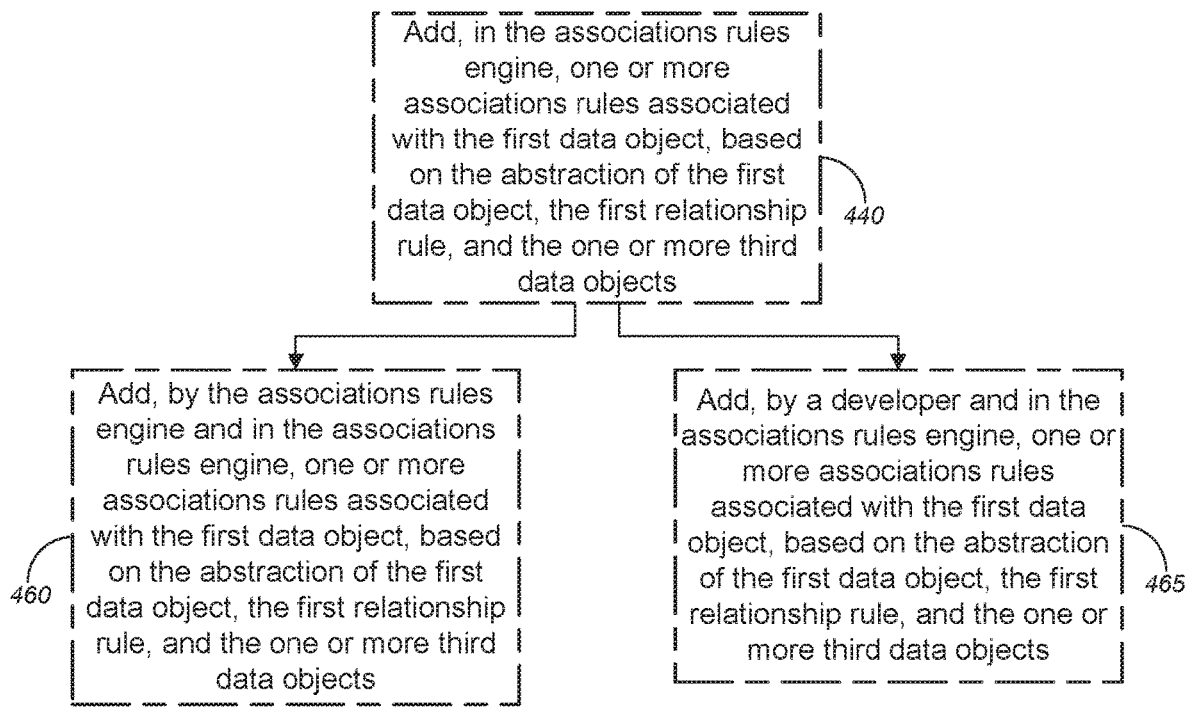

FIGS. 4A-4C (collectively, "FIG. 4") are flow diagrams illustrating a method 400 for implementing data associations, in accordance with various embodiments.

While the techniques and procedures are depicted and/or described in a certain order for purposes of illustration, it should be appreciated that certain procedures may be reordered and/or omitted within the scope of various embodiments. Moreover, while the method 400 illustrated by FIG. 4 can be implemented by or with (and, in some cases, are described below with respect to) the systems, examples, or embodiments 100, 200, and 300 of FIGS. 1, 2, and 3, respectively (or components thereof), such methods may also be implemented using any suitable hardware (or software) implementation. Similarly, while each of the systems, examples, or embodiments 100, 200, and 300 of FIGS. 1, 2, and 3, respectively (or components thereof), can operate according to the method 400 illustrated by FIG. 4 (e.g., by executing instructions embodied on a computer readable medium), the systems, examples, or embodiments 100, 200, and 300 of FIGS. 1, 2, and 3 can each also operate according to other modes of operation and/or perform other suitable procedures.

In the non-limiting embodiment of FIG. 4A, method 400, at block 405, might comprise receiving, with an associations rules engine and from a computing system, a request regarding information associated with a first data object. At block 410, method 400 might comprise retrieving, with the associations rules engine and from a data fabric, the first data object and a first relationship rule corresponding to the first data object, the data fabric containing a plurality of first data objects and a plurality of first relationship rules, each first relationship rule indicating a one-to-one relationship between a corresponding first data object and a corresponding second data object.

Method 400 might further comprise, at block 415, querying, with the associations rules engine, one or more data aggregation data services to determine whether the first data object is associated with one or more third data objects. Method 400 might further comprise abstracting, with the associations rules engine, the first data object, the first relationship rule, and the one or more third data objects (block 420).

At block 425, method 400 might comprise updating, with the associations rules engine and in a metadata catalog, a catalog entry corresponding to the first data object with one or more associations among the first data object, each of a corresponding second data object, and each of the identified one or more third data objects. According to some embodiments, association between the first data object and each of the one or more third data objects is defined by a business rules engine, which is separate from the associations rules engine, where the one or more data aggregation data services stores the association between the first data object and each of the one or more third data objects as defined by the business rules engine. Method 400, at block 430, might comprise providing the computing system with access to the catalog entry corresponding to the first data object, the computing system performing one or more computational tasks using the associations stored in the catalog entry corresponding to the first data object.

In some embodiments, method 400 might further comprise at least one of adding, in the catalog entry corresponding to the first data object, one or more attributes associated with the first data object, based on the abstraction of the first data object, the first relationship rule, and the one or more third data objects (optional block 435) and/or adding, in the associations rules engine, one or more associations rules associated with the first data object, based on the abstraction of the first data object, the first relationship rule, and the one or more third data objects (optional block 440).

At optional block 445, method 400 might comprise analyzing, with the associations rules engine, the first data object and data stored in at least one of the data fabric or one or more databases to identify one or more third data objects that are associated with the first data object.

With reference to FIG. 4B, adding, in the catalog entry corresponding to the first data object, the one or more attributes associated with the first data object (at optional block 435) might comprise adding, with the association rules engine and in the catalog entry corresponding to the first data object, one or more attributes associated with the first data object, based on the abstraction of the first data object, the first relationship rule, and the one or more third data objects (optional block 450). Alternatively, adding, in the catalog entry corresponding to the first data object, the one or more attributes associated with the first data object (at optional block 435) might comprise adding, by a developer and in the catalog entry corresponding to the first data object, one or more attributes associated with the first data object, based on the abstraction of the first data object, the first relationship rule, and the one or more third data objects (optional block 455).

Referring to FIG. 4C, adding, in the associations rules engine, the one or more associations rules associated with the first data object (at optional block 440) might comprise adding, by the associations rules engine and in the associations rules engine, one or more associations rules associated with the first data object, based on the abstraction of the first data object, the first relationship rule, and the one or more third data objects (optional block 460). Alternatively, adding, in the catalog entry corresponding to the first data object, the one or more attributes associated with the first data object (at optional block 440) might comprise adding, by a developer and in the associations rules engine, one or more associations rules associated with the first data object, based on the abstraction of the first data object, the first relationship rule, and the one or more third data objects (optional block 465).

Exemplary System and Hardware Implementation

Figure 5:
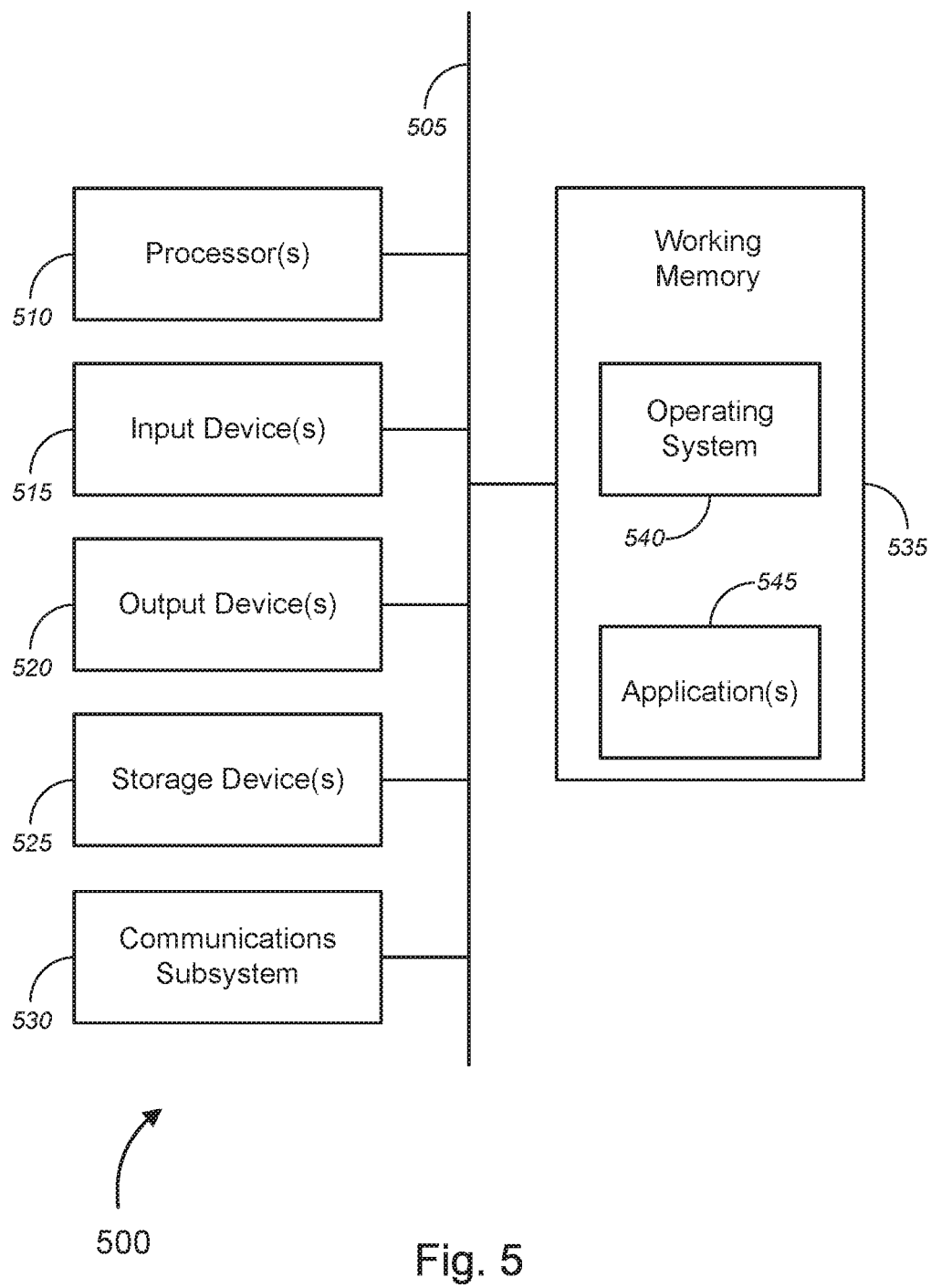
FIG. 5 is a block diagram illustrating an exemplary computer or system hardware architecture, in accordance with various embodiments.

FIG. 5 is a block diagram illustrating an exemplary computer or system hardware architecture, in accordance with various embodiments. FIG. 5 provides a schematic illustration of one embodiment of a computer system 500 of the service provider system hardware that can perform the methods provided by various other embodiments, as described herein, and/or can perform the functions of computer or hardware system (i.e., computing systems 105a and 105b, user devices 110, associations rules engines 140, 240, and 320, business rules engines 155, 260, and 325, and data services server 160, etc.), as described above. It should be noted that FIG. 5 is meant only to provide a generalized illustration of various components, of which one or more (or none) of each may be utilized as appropriate. FIG. 5, therefore, broadly illustrates how individual system elements may be implemented in a relatively separated or relatively more integrated manner.

The computer or hardware system 500—which might represent an embodiment of the computer or hardware system (i.e., computing systems 105a and 105b, user devices 110, associations rules engines 140, 240, and 320, business rules engines 155, 260, and 325, and data services server 160, etc.), described above with respect to FIGS. 1-4—is shown comprising hardware elements that can be electrically coupled via a bus 505 (or may otherwise be in communication, as appropriate). The hardware elements may include one or more processors 510, including, without limitation, one or more general-purpose processors and/or one or more special-purpose processors (such as microprocessors, digital signal processing chips, graphics acceleration processors, and/or the like); one or more input devices 515, which can include, without limitation, a mouse, a keyboard, and/or the like; and one or more output devices 520, which can include, without limitation, a display device, a printer, and/or the like.

The computer or hardware system 500 may further include (and/or be in communication with) one or more storage devices 525, which can comprise, without limitation, local and/or network accessible storage, and/or can include, without limitation, a disk drive, a drive array, an optical storage device, solid-state storage device such as a random access memory ("RAM") and/or a read-only memory ("ROM"), which can be programmable, flash-updateable, and/or the like. Such storage devices may be configured to implement any appropriate data stores, including, without limitation, various file systems, database structures, and/or the like.

The computer or hardware system 500 might also include a communications subsystem 530, which can include, without limitation, a modem, a network card (wireless or wired), an infra-red communication device, a wireless communication device and/or chipset (such as a Bluetooth™ device, an 802.11 device, a WiFi device, a WiMax device, a WWAN device, cellular communication facilities, etc.), and/or the like. The communications subsystem 530 may permit data to be exchanged with a network (such as the network described below, to name one example), with other computer or hardware systems, and/or with any other devices described herein. In many embodiments, the computer or hardware system 500 will further comprise a working memory 535, which can include a RAM or ROM device, as described above.

The computer or hardware system 500 also may comprise software elements, shown as being currently located within the working memory 535, including an operating system 540, device drivers, executable libraries, and/or other code, such as one or more application programs 545, which may comprise computer programs provided by various embodiments (including, without limitation, hypervisors, VMs, and the like), and/or may be designed to implement methods, and/or configure systems, provided by other embodiments, as described herein. Merely by way of example, one or more procedures described with respect to the method(s) discussed above might be implemented as code and/or instructions executable by a computer (and/or a processor within a computer); in an aspect, then, such code and/or instructions can be used to configure and/or adapt a general purpose computer (or other device) to perform one or more operations in accordance with the described methods.

A set of these instructions and/or code might be encoded and/or stored on a non-transitory computer readable storage medium, such as the storage device(s) 525 described above. In some cases, the storage medium might be incorporated within a computer system, such as the system 500. In other embodiments, the storage medium might be separate from a computer system (i.e., a removable medium, such as a compact disc, etc.), and/or provided in an installation package, such that the storage medium can be used to program, configure, and/or adapt a general purpose computer with the instructions/code stored thereon. These instructions might take the form of executable code, which is executable by the computer or hardware system 500 and/or might take the form of source and/or installable code, which, upon compilation and/or installation on the computer or hardware system 500 (e.g., using any of a variety of generally available compilers, installation programs, compression/decompression utilities, etc.) then takes the form of executable code.

It will be apparent to those skilled in the art that substantial variations may be made in accordance with specific requirements. For example, customized hardware (such as programmable logic controllers, field-programmable gate arrays, application-specific integrated circuits, and/or the like) might also be used, and/or particular elements might be implemented in hardware, software (including portable software, such as applets, etc.), or both. Further, connection to other computing devices such as network input/output devices may be employed.

As mentioned above, in one aspect, some embodiments may employ a computer or hardware system (such as the computer or hardware system 500) to perform methods in accordance with various embodiments of the invention. According to a set of embodiments, some or all of the procedures of such methods are performed by the computer or hardware system 500 in response to processor 510 executing one or more sequences of one or more instructions (which might be incorporated into the operating system 540 and/or other code, such as an application program 545) contained in the working memory 535. Such instructions may be read into the working memory 535 from another computer readable medium, such as one or more of the storage device(s) 525. Merely by way of example, execution of the sequences of instructions contained in the working memory 535 might cause the processor(s) 510 to perform one or more procedures of the methods described herein.

The terms "machine readable medium" and "computer readable medium," as used herein, refer to any medium that participates in providing data that causes a machine to operate in a specific fashion. In an embodiment implemented using the computer or hardware system 500, various computer readable media might be involved in providing instructions/code to processor(s) 510 for execution and/or might be used to store and/or carry such instructions/code (e.g., as signals). In many implementations, a computer readable medium is a non-transitory, physical, and/or tangible storage medium. In some embodiments, a computer readable medium may take many forms, including, but not limited to, non-volatile media, volatile media, or the like. Non-volatile media includes, for example, optical and/or magnetic disks, such as the storage device(s) 525. Volatile media includes, without limitation, dynamic memory, such as the working memory 535. In some alternative embodiments, a computer readable medium may take the form of transmission media, which includes, without limitation, coaxial cables, copper wire, and fiber optics, including the wires that comprise the bus 505, as well as the various components of the communication subsystem 530 (and/or the media by which the communications subsystem 530 provides communication with other devices). In an alternative set of embodiments, transmission media can also take the form of waves (including without limitation radio, acoustic, and/or light waves, such as those generated during radio-wave and infra-red data communications).

Common forms of physical and/or tangible computer readable media include, for example, a floppy disk, a flexible disk, a hard disk, magnetic tape, or any other magnetic medium, a CD-ROM, any other optical medium, punch cards, paper tape, any other physical medium with patterns of holes, a RAM, a PROM, and EPROM, a FLASH-EPROM, any other memory chip or cartridge, a carrier wave as described hereinafter, or any other medium from which a computer can read instructions and/or code.

Various forms of computer readable media may be involved in carrying one or more sequences of one or more instructions to the processor(s) 510 for execution. Merely by way of example, the instructions may initially be carried on a magnetic disk and/or optical disc of a remote computer. A remote computer might load the instructions into its dynamic memory and send the instructions as signals over a transmission medium to be received and/or executed by the computer or hardware system 500. These signals, which might be in the form of electromagnetic signals, acoustic signals, optical signals, and/or the like, are all examples of carrier waves on which instructions can be encoded, in accordance with various embodiments of the invention.

The communications subsystem 530 (and/or components thereof) generally will receive the signals, and the bus 505 then might carry the signals (and/or the data, instructions, etc. carried by the signals) to the working memory 535, from which the processor(s) 505 retrieves and executes the instructions. The instructions received by the working memory 535 may optionally be stored on a storage device 525 either before or after execution by the processor(s) 510.

Figure 6:
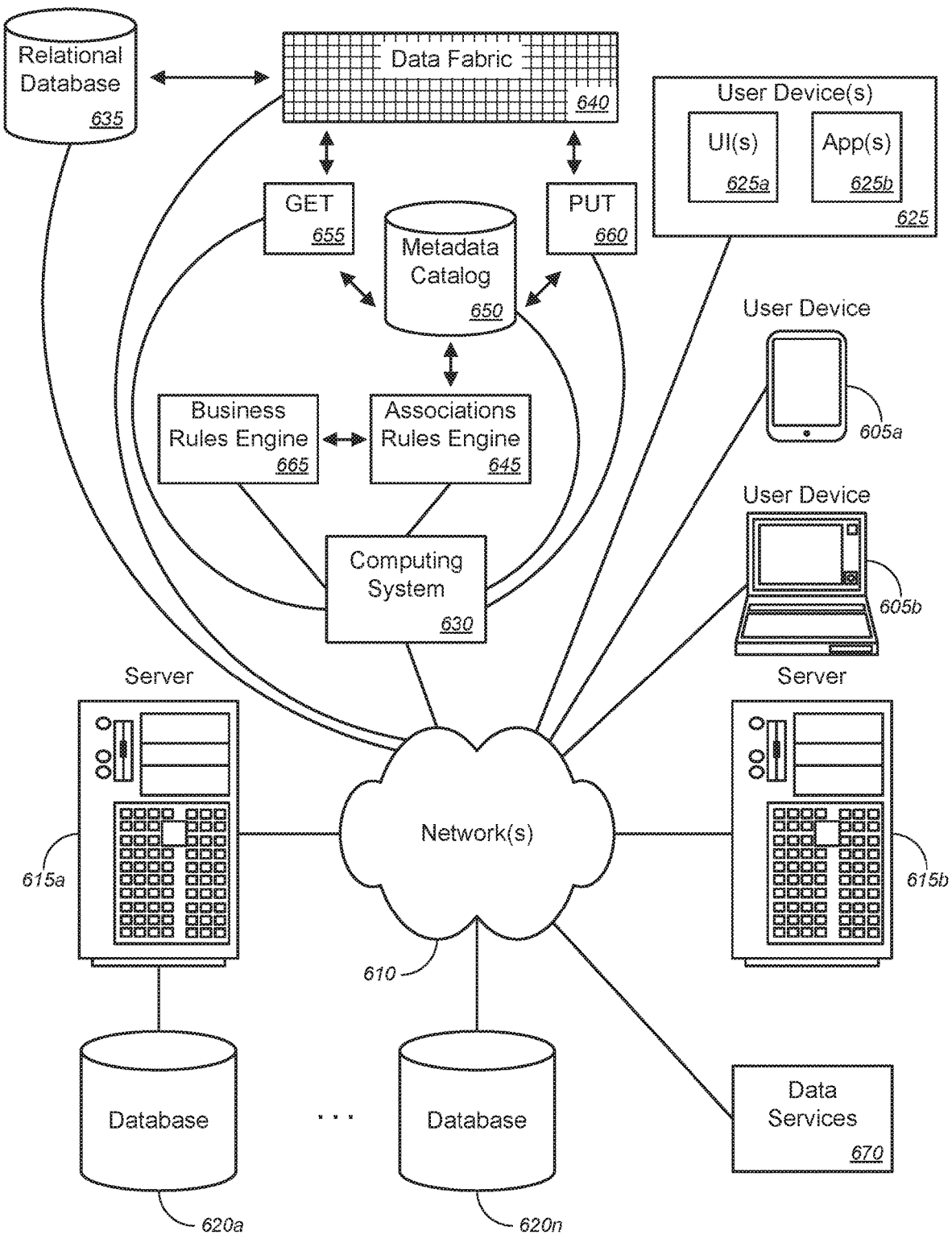
FIG. 6 is a block diagram illustrating a networked system of computers, computing systems, or system hardware architecture, which can be used in accordance with various embodiments.

As noted above, a set of embodiments comprises methods and systems for implementing data storage and/or retrieval, and, more particularly, to methods, systems, and apparatuses for implementing data associations. FIG. 6 illustrates a schematic diagram of a system 600 that can be used in accordance with one set of embodiments. The system 600 can include one or more user computers, user devices, or customer devices 605. A user computer, user device, or customer device 605 can be a general purpose personal computer (including, merely by way of example, desktop computers, tablet computers, laptop computers, handheld computers, and the like, running any appropriate operating system, several of which are available from vendors such as Apple, Microsoft Corp., and the like), cloud computing devices, a server(s), and/or a workstation computer(s) running any of a variety of commercially-available UNIX™ or UNIX-like operating systems. A user computer, user device, or customer device 605 can also have any of a variety of applications, including one or more applications configured to perform methods provided by various embodiments (as described above, for example), as well as one or more office applications, database client and/or server applications, and/or web browser applications. Alternatively, a user computer, user device, or customer device 605 can be any other electronic device, such as a thin-client computer, Internet-enabled mobile telephone, and/or personal digital assistant, capable of communicating via a network (e.g., the network(s) 610 described below) and/or of displaying and navigating web pages or other types of electronic documents. Although the exemplary system 600 is shown with two user computers, user devices, or customer devices 605, any number of user computers, user devices, or customer devices can be supported.

Certain embodiments operate in a networked environment, which can include a network(s) 610. The network(s) 610 can be any type of network familiar to those skilled in the art that can support data communications using any of a variety of commercially-available (and/or free or proprietary) protocols, including, without limitation, TCP/IP, SNA™, IPX™, AppleTalk™, and the like. Merely by way of example, the network(s) 610 (similar to network(s) 115 FIG. 1, or the like) can each include a local area network ("LAN"), including, without limitation, a fiber network, an Ethernet network, a Token-Ring™ network, and/or the like; a wide-area network ("WAN"); a wireless wide area network ("WWAN"); a virtual network, such as a virtual private network ("VPN"); the Internet; an intranet; an extranet; a public switched telephone network ("PSTN"); an infra-red network; a wireless network, including, without limitation, a network operating under any of the IEEE 802.11 suite of protocols, the Bluetooth™ protocol known in the art, and/or any other wireless protocol; and/or any combination of these and/or other networks. In a particular embodiment, the network might include an access network of the service provider (e.g., an Internet service provider ("ISP")). In another embodiment, the network might include a core network of the service provider, and/or the Internet.

Embodiments can also include one or more server computers 615. Each of the server computers 615 may be configured with an operating system, including, without limitation, any of those discussed above, as well as any commercially (or freely) available server operating systems. Each of the servers 615 may also be running one or more applications, which can be configured to provide services to one or more clients 605 and/or other servers 615.

Merely by way of example, one of the servers 615 might be a data server, a web server, a cloud computing device(s), or the like, as described above. The data server might include (or be in communication with) a web server, which can be used, merely by way of example, to process requests for web pages or other electronic documents from user computers 605. The web server can also run a variety of server applications, including HTTP servers, FTP servers, CGI servers, database servers, Java servers, and the like. In some embodiments of the invention, the web server may be configured to serve web pages that can be operated within a web browser on one or more of the user computers 605 to perform methods of the invention.

The server computers 615, in some embodiments, might include one or more application servers, which can be configured with one or more applications accessible by a client running on one or more of the client computers 605 and/or other servers 615. Merely by way of example, the server(s) 615 can be one or more general purpose computers capable of executing programs or scripts in response to the user computers 605 and/or other servers 615, including, without limitation, web applications (which might, in some cases, be configured to perform methods provided by various embodiments). Merely by way of example, a web application can be implemented as one or more scripts or programs written in any suitable programming language, such as Java™, C, C#™ or C++, and/or any scripting language, such as Perl, Python, or TCL, as well as combinations of any programming and/or scripting languages. The application server(s) can also include database servers, including, without limitation, those commercially available from Oracle™, Microsoft™, Sybase™, IBM™, and the like, which can process requests from clients (including, depending on the configuration, dedicated database clients, API clients, web browsers, etc.) running on a user computer, user device, or customer device 605 and/or another server 615. In some embodiments, an application server can perform one or more of the processes for implementing data storage and/or retrieval, and, more particularly, to methods, systems, and apparatuses for implementing data associations, as described in detail above. Data provided by an application server may be formatted as one or more web pages (comprising HTML, JavaScript, etc., for example) and/or may be forwarded to a user computer 605 via a web server (as described above, for example). Similarly, a web server might receive web page requests and/or input data from a user computer 605 and/or forward the web page requests and/or input data to an application server. In some cases, a web server may be integrated with an application server.

In accordance with further embodiments, one or more servers 615 can function as a file server and/or can include one or more of the files (e.g., application code, data files, etc.) necessary to implement various disclosed methods, incorporated by an application running on a user computer 605 and/or another server 615. Alternatively, as those skilled in the art will appreciate, a file server can include all necessary files, allowing such an application to be invoked remotely by a user computer, user device, or customer device 605 and/or server 615.

It should be noted that the functions described with respect to various servers herein (e.g., application server, database server, web server, file server, etc.) can be performed by a single server and/or a plurality of specialized servers, depending on implementation-specific needs and parameters.

In certain embodiments, the system can include one or more databases 620a-620n (collectively, "databases 620"). The location of each of the databases 620 is discretionary: merely by way of example, a database 620a might reside on a storage medium local to (and/or resident in) a server 615a (and/or a user computer, user device, or customer device 605). Alternatively, a database 620n can be remote from any or all of the computers 605, 615, so long as it can be in communication (e.g., via the network 610) with one or more of these. In a particular set of embodiments, a database 620 can reside in a storage-area network ("SAN") familiar to those skilled in the art. (Likewise, any necessary files for performing the functions attributed to the computers 605, 615 can be stored locally on the respective computer and/or remotely, as appropriate.) In one set of embodiments, the database 620 can be a relational database, such as an Oracle database, that is adapted to store, update, and retrieve data in response to SQL-formatted commands. The database might be controlled and/or maintained by a database server, as described above, for example.

According to some embodiments, system 600 might further comprise one or more user devices 625 (similar to user devices 110 of FIG. 1, or the like) comprising user interface(s) ("UI(s)") 625a and software application(s) ("App(s)") 625b (similar to user interface(s) 110a and software application(s) 110b of FIG. 1, or the like). System 600 might further comprise computing system 630 (similar to computing system 105a or 105b of FIG. 1, or the like), relational database 635 (similar to relational databases 120a-120d, 215, 220a-220d, and 305 of FIGS. 1-3, or the like), data fabric 640 (similar to data fabric 125, 225, and 310 of FIGS. 1-3, or the like), associations rules engine 645 (similar to associations rules engine 140, 240, and 320 of FIGS. 1-3, or the like), metadata catalog 650 (similar to metadata catalogs 135, 245, and 315 of FIGS. 1-3, or the like), get function 655 (similar to get functions 145 and 250 of FIGS. 1 and 2, or the like), put function 660 (similar to put functions 150 and 255 of FIGS. 1 and 2, or the like), business rules engine 665 (similar to business rules engine 155, 260, and 325 of FIGS. 1-3, or the like), and data services server 670 (similar to data services server 160 of FIG. 1, or the like), and/or the like.

In operation, the associations rules engine 645 might receive, from one of user device 605a, user device 605b, user device 605c, and/or computing system 630, a request regarding information associated with a first data object; might retrieve, from data fabric 640 (in some cases, via get function 655), the first data object and a first relationship rule corresponding to the first data object, the data fabric containing a plurality of first data objects and a plurality of first relationship rules as obtained by relational database 635, each first relationship rule indicating a one-to-one relationship between a corresponding first data object and a corresponding second data object; might query one or more data aggregation data services (e.g., data services servers 670 or the like) to determine whether the first data object is associated with one or more third data objects; might abstract the first data object, the first relationship rule, and the one or more third data objects; might update, in metadata catalog 650 (in some cases, via get function 660), a catalog entry corresponding to the first data object with one or more associations among the first data object, each of a corresponding second data object, and each of the identified one or more third data objects; and might provide the one of the user device 605a, the user device 605b, the user device 605c, and/or the computing system 630 with access to the catalog entry corresponding to the first data object, the one of the user device 605a, the user device 605b, the user device 605c, and/or the computing system 630 performing one or more computational tasks using the associations stored in the catalog entry corresponding to the first data object.

These and other functions of the system 600 (and its components) are described in greater detail above with respect to FIGS. 1-4.

While certain features and aspects have been described with respect to exemplary embodiments, one skilled in the art will recognize that numerous modifications are possible. For example, the methods and processes described herein may be implemented using hardware components, software components, and/or any combination thereof. Further, while various methods and processes described herein may be described with respect to particular structural and/or functional components for ease of description, methods provided by various embodiments are not limited to any particular structural and/or functional architecture but instead can be implemented on any suitable hardware, firmware and/or software configuration. Similarly, while certain functionality is ascribed to certain system components, unless the context dictates otherwise, this functionality can be distributed among various other system components in accordance with the several embodiments.

Moreover, while the procedures of the methods and processes described herein are described in a particular order for ease of description, unless the context dictates otherwise, various procedures may be reordered, added, and/or omitted in accordance with various embodiments. Moreover, the procedures described with respect to one method or process may be incorporated within other described methods or processes; likewise, system components described according to a particular structural architecture and/or with respect to one system may be organized in alternative structural architectures and/or incorporated within other described systems. Hence, while various embodiments are described with—or without—certain features for ease of description and to illustrate exemplary aspects of those embodiments, the various components and/or features described herein with respect to a particular embodiment can be substituted, added and/or subtracted from among other described embodiments, unless the context dictates otherwise. Consequently, although several exemplary embodiments are described above, it will be appreciated that the invention is intended to cover all modifications and equivalents within the scope of the following claims.

What is claimed is:

1. A method, comprising:
    receiving, with an associations rules engine and from a computing system, a request regarding information associated with a first data object;
    retrieving, with the associations rules engine and from a data fabric, the first data object and a first relationship rule corresponding to the first data object;
    querying, with the associations rules engine, one or more data aggregation data services to determine whether the first data object is associated with one or more third data objects;
    abstracting, with the associations rules engine, the first data object, the first relationship rule, and the one or more third data objects;
    updating, with the associations rules engine, a catalog entry corresponding to the first data object with one or more associations among the first data object and each of the identified one or more third data objects; and
    providing the computing system with access to the catalog entry corresponding to the first data object.

2. The method of claim 1, wherein adding, in the catalog entry corresponding to the first data object, the one or more attributes associated with the first data object comprises adding, with the association rules engine and in the catalog entry corresponding to the first data object, one or more attributes associated with the first data object, based on the abstraction of the first data object, the first relationship rule, and the one or more third data objects.

3. The method of claim 1, wherein adding, in the catalog entry corresponding to the first data object, the one or more attributes associated with the first data object comprises adding, by a developer and in the catalog entry corresponding to the first data object, one or more attributes associated with the first data object, based on the abstraction of the first data object, the first relationship rule, and the one or more third data objects.

4. The method of claim 1, further comprising:
adding, in the associations rules engine, one or more associations rules associated with the first data object, based on the abstraction of the first data object, the first relationship rule, and the one or more third data objects.

5. The method of claim 4, wherein adding, in the associations rules engine, the one or more associations rules associated with the first data object comprises adding, by the associations rules engine and in the associations rules engine, one or more associations rules associated with the first data object, based on the abstraction of the first data object, the first relationship rule, and the one or more third data objects.

6. The method of claim 4, wherein adding, in the associations rules engine, the one or more associations rules associated with the first data object comprises adding, by a developer and in the associations rules engine, one or more associations rules associated with the first data object, based on the abstraction of the first data object, the first relationship rule, and the one or more third data objects.

7. The method of claim 1, further comprising:
analyzing, with the associations rules engine, the first data object and data stored in at least one of the data fabric or one or more databases to identify one or more third data objects that are associated with the first data object.

8. The method of claim 1, wherein association between the first data object and each of the one or more third data objects is defined by a business rules engine, which is separate from the associations rules engine, wherein the one or more data aggregation data services stores the association between the first data object and each of the one or more third data objects as defined by the business rules engine.

9. An associations rules engine, comprising:
at least one processor; and
a non-transitory computer readable medium communicatively coupled to the at least one processor, the non-transitory computer readable medium having stored thereon computer software comprising a set of instructions that, when executed by the at least one processor, causes the associations rules engine to:
receive, from a computing system, a request regarding information associated with a first data object;
retrieve, from a data fabric, the first data object and a first relationship rule corresponding to the first data object;
query one or more data aggregation data services to determine whether the first data object is associated with one or more third data objects;
abstract the first data object, the first relationship rule, and the one or more third data objects;
update a catalog entry corresponding to the first data object with one or more associations among the first data object and each of the identified one or more third data objects; and
provide the computing system with access to the catalog entry corresponding to the first data object.

10. The apparatus of claim 9, wherein the set of instructions, when executed by the at least one processor, further causes the associations rules engine to:
add, in the associations rules engine, one or more associations rules associated with the first data object, based on the abstraction of the first data object, the first relationship rule, and the one or more third data objects.

11. The apparatus of claim 9, wherein the set of instructions, when executed by the at least one processor, further causes the associations rules engine to:
analyze the first data object and data stored in at least one of the data fabric or one or more databases to identify one or more third data objects that are associated with the first data object.

12. The apparatus of claim 9, wherein association between the first data object and each of the one or more third data objects is defined by a business rules engine, which is separate from the associations rules engine, wherein the one or more data aggregation data services stores the association between the first data object and each of the one or more third data objects as defined by the business rules engine.

13. A system, comprising:
a computing system, comprising:
at least one first processor; and
a first non-transitory computer readable medium communicatively coupled to the at least one first processor, the first non-transitory computer readable medium having stored thereon computer software comprising a first set of instructions that, when executed by the at least one first processor, causes the computing system to:
send, to an association rules engine, a request regarding information associated with a first data object;
the association rules engine, comprising:
at least one second processor; and
a second non-transitory computer readable medium communicatively coupled to the at least one second processor, the second non-transitory computer readable medium having stored thereon computer software comprising a second set of instructions that, when executed by the at least one second processor, causes the association rules engine to:
receive, from the computing system, the request regarding information associated with the first data object;
retrieve, from a data fabric, the first data object and a first relationship rule corresponding to the first data object;
query one or more data aggregation data services to determine whether the first data object is associated with one or more third data objects;
abstract the first data object, the first relationship rule, and the one or more third data objects;
update a catalog entry corresponding to the first data object with one or more associations among the first data object and each of the identified one or more third data objects; and
provide the computing system with access to the catalog entry corresponding to the first data object.

14. The system of claim 13, wherein the second set of instructions, when executed by the at least one second processor, further causes the associations rules engine to:
add, in the associations rules engine, one or more associations rules associated with the first data object, based on the abstraction of the first data object, the first relationship rule, and the one or more third data objects.

15. The system of claim 13, wherein the second set of instructions, when executed by the at least one second processor, further causes the associations rules engine to:
analyze the first data object and data stored in at least one of the data fabric or one or more databases to identify one or more third data objects that are associated with the first data object.

16. The system of claim 13, wherein association between the first data object and each of the one or more third data objects is defined by a business rules engine, which is separate from the associations rules engine, wherein the one or more data aggregation data services stores the association between the first data object and each of the one or more third data objects as defined by the business rules engine.

\* \* \* \* \*